United States Patent [19]

Dochovna

[11] Patent Number: 5,521,623

[45] Date of Patent: May 28, 1996

[54] PRINTING METHOD AND APPARATUS

[75] Inventor: Rami Y. Dochovna, Petach Tikva, Israel

[73] Assignee: Nur Industries (1987) Ltd., Petach Tikva, Israel

[21] Appl. No.: 964,661

[22] Filed: Oct. 22, 1992

[30] Foreign Application Priority Data

Oct. 29, 1991 [IL] Israel .......................................... 99896

[51] Int. Cl.⁶ ................................ B41J 2/01; B41J 2/075
[52] U.S. Cl. ..................................... 347/74; 347/2
[58] Field of Search .................................. 347/2, 4, 74, 77

[56] References Cited

U.S. PATENT DOCUMENTS

| | | |
|---|---|---|
| 3,346,869 | 10/1967 | Stone . |
| 3,553,371 | 1/1971 | Suenaga . |
| 3,604,846 | 9/1971 | Behane et al. . |
| 3,864,692 | 2/1975 | McDonnell et al. ................... 347/77 X |
| 3,928,718 | 12/1975 | Sagae et al. . |
| 4,086,602 | 4/1978 | Yamada . |
| 4,384,295 | 5/1983 | Lewis et al. ............................... 347/77 |
| 4,540,996 | 9/1985 | Saito . |
| 4,547,786 | 10/1985 | Logan et al. . |
| 4,622,561 | 11/1986 | Koike . |
| 4,672,390 | 6/1987 | Ishikawa . |
| 4,734,868 | 3/1988 | DeLacy . |
| 4,811,038 | 3/1989 | Gordon et al. . |
| 4,847,631 | 7/1989 | Naruse et al. . |
| 4,896,173 | 1/1990 | Shimada et al. . |
| 4,920,258 | 4/1990 | Saito . |
| 4,975,780 | 12/1990 | Kuboki . |
| 5,172,238 | 12/1992 | Kuboki . |
| 5,177,508 | 1/1993 | Bacus et al. . |
| 5,402,164 | 3/1995 | Mutoh . |

FOREIGN PATENT DOCUMENTS

| | | |
|---|---|---|
| 0023433 | 2/1981 | European Pat. Off. . |
| 0023433A2 | 2/1981 | European Pat. Off. . |
| 0036787 | 9/1981 | European Pat. Off. ................. 347/74 |
| 0360169 | 3/1990 | European Pat. Off. . |
| 0394634 | 10/1990 | European Pat. Off. . |
| 0391276A2 | 10/1990 | European Pat. Off. . |
| 2025686 | 9/1970 | France . |
| 58-140260 | 8/1983 | Japan . |
| 61-179272 | 8/1986 | Japan . |
| 62-243890 | 10/1987 | Japan . |
| 63-145379 | 6/1988 | Japan . |
| 1289698 | 9/1972 | United Kingdom . |

OTHER PUBLICATIONS

IBM Technical Disclosure Bulletin vol. 16, No. 1, Jun. 1973, pp. 144–145. R. C. Pearson et al 'ink jet color copier and universal printer'.

*Primary Examiner*—Joan H. Pendegrass
*Attorney, Agent, or Firm*—Merchant, Gould, Smith, Edell, Welter & Schmidt

[57] ABSTRACT

An apparatus for continuously printing on a continuous print substrate in sheet form comprises means for supporting and continuously feeding a continuous sheet of print substrate past at least a printing station, wherein at least a printing station comprises a number of ink-jet printing heads of the drop deviation type mounted with their axial planes perpendicular to the direction of the print substrate feed motion.

9 Claims, 4 Drawing Sheets

PRINTING METHOD AND APPARATUS

FIELD OF THE INVENTION

This invention refers to a printing method and apparatus, more specifically to a method and apparatus for printing non-repetitive, non-periodical patterns, in a continuous manner and at high speed, on a print substrate in the form of a continuous sheet. The print substrate may be a textile fabric, a paper or a plastic sheet, or any other suitable continuous sheet structure.

THE PRIOR ART

The printing art comprises many methods and apparatus for printing in a continuous manner on continuous sheet backings, in particular textile fabrics, which comprises contacting the backing, which is advanced in a continuous manner, with mechanical elements which embody the patterns to be printed and distribute the colors or inks on the backing. Such mechanical elements are usually printing rollers or cylinders, which embody the pattern to be printed, each cylinder corresponding to one color. While such method and apparatus, of which a great variety of types is known in the art, is fast and economical in operation, it has two main disadvantages: firstly, the printing is necessarily periodical and the patterns must be repeated at relatively short intervals, the length of which is determined by the length of the apparatus itself, so that if a certain variety of patterns is desired, the apparatus must be quite cumbersome; secondly, for each pattern and for each color, one or more printing cylinders must be provided, and this renders the apparatus itself expensive, since the printing cylinders must be changed every time the pattern is changed.

Printing methods are generally known which do not require the use of mechanical elements embodying the printing patterns but employ apparatus which can be controlled to give variable patterns. Such methods are particularly those employing the ink-jet technique, which rely on a computerized control of the printing stations to obtain the desired patterns. In this case, too, multi-color printing can be obtained by using a plurality of printing heads, each depositing on the print substrate a different color. However, the art does not disclose method or apparatus which permit to print in a continuous manner by this technique which has been used essentially to produce single pieces, although several such pieces may in some cases be attached to one another after printing to compose long graphics. Such a technique is described, e.g., for printing on paper to produce billboards and the like, in U.S. Pat. Nos. 3,553,371, 4,547,786 and 4,811,038. Apart from the fact that they have permitted so far to produce only single pieces, the printing apparatuses disclosed therein are slow and therefore uneconomical for mass production. Furthermore, the patterns are defined in the prior art by a reduced scale original, which is scanned to derive from it chromatic information which is transmitted to computer means controlling the printing stations, and therefore only the pattern which is carried by the original can be printed and, should the print substrate be in the form of a continuous sheet—which possibility is not considered in the prior art—the printing would be inevitably repetitive and periodical.

It is a purpose of the invention to effect the continuous printing of continuous print substrates by eliminating all the limitations and drawbacks of the known method and apparatus. More specifically, it is a purpose of the invention to provide a printing method and apparatus that permits to print in a continuous manner on a continuous print substrate any desired patterns, in particular non-repetitive and non-periodical patterns, with any desired number of colors.

It is another purpose of the invention to provide a method and apparatus by which such a printing can be effected at very high speed.

It is a further purpose of the invention to achieve the aforementioned purposes with a method and apparatus which are economical and do not require any mechanical elements representing any specific pattern.

Other purposes of the invention will appear as the description proceeds.

SUMMARY OF THE INVENTION

The apparatus according to the invention is characterized in that it comprises means for supporting and continuously feeding a continuous sheet of print substrate past at least a printing station, at least a printing station comprising a number of ink-jet printing heads of the "drop deviation" type, as hereinafter defined, mounted with their "axial planes", as hereinafter defined, perpendicular to the direction of the print substrate feed motion, and preferably in such a positioned relationship to the substrate and to one another that they will cover the entire width of the print substrate.

By "drop deviation" ink-jet printing heads are meant the heads which eject ink in the form of drops and deviate the trajectory of the drops so that the same will impinge on a print substrate, located in their path and preferably, though not necessarily, perpendicular to the plane in which all the trajectories substantially lie, on various points of a straight line.

By "axial plane" of a printing head, if the head ejects only one drop at a time, is meant the plane on which the possible trajectories of the drop ejected by the head substantially lie. If the head is capable of concurrently ejecting a plurality of drops, an axial plane will correspond in principle to each drop, though several or all of such planes may coincide.

The expressions "continuously feeding" and "continuous motion" do not exclude that the feed motion be partly intermittent, as long as it is substantially continuous while the printing is being effected.

The method according to the invention comprises the steps of continuously feeding a continuous sheet of print substrate past at least a printing station, depositing from said station onto the substrate printing inks or dyes, in the form of drops, at predetermined positions along the width of the substrate by ejecting them from a plurality of orifices and deviating them along said width to the extent required for them to reach said predetermined positions, the distance between the substrate and said orifices being preferably such that the positions onto which the drops can be deposited by said station substantially covers the entire width of the substrate, and controlling the ejection and the deviation of said drops in coordination with the substrate feed motion, to produce the desired print patterns. By "deviation" of a printing head is meant the distance between the most distant points on which a single drop ejected from the head can impinge on the print substrate, viz. the distance between the intersections with the print substrate surface plane of the two, among the possible drop trajectories, that are most distant from one another (said deviation being dependent on the distance between the head and the print substrate). A printing head capable of concurrently ejecting several drops may in principle have several deviations, each relating to one drop.

DETAILED DESCRIPTION OF PREFERRED EMBODIMENTS

In a preferred form of the invention, the print substrate is positioned below the printing heads in the part of the machine in which the deposition of the ink drops occurs (hereinafter called the "printing space") and is maintained in a sufficiently tensioned condition to provide a substantially flat surface for receiving said ink drops , or other means, within the purview of the skilled person, are provided for the same purpose.

In a preferred form of the invention the drop deviation printing heads are of the electrostatic type, e.g. of the type in which ink is flown continuously and is continuously discharged when no printing occurs, and is electrostatically charged and deviated in drop form by an electrostatic field, whenever a colored dot is to be printed on the print substrate, to direct said drop to fall in a predetermined position among a number of possible positions to which it may be directed. Apparatus of this kind are known per se in the art and available on the market.

Figure 2:
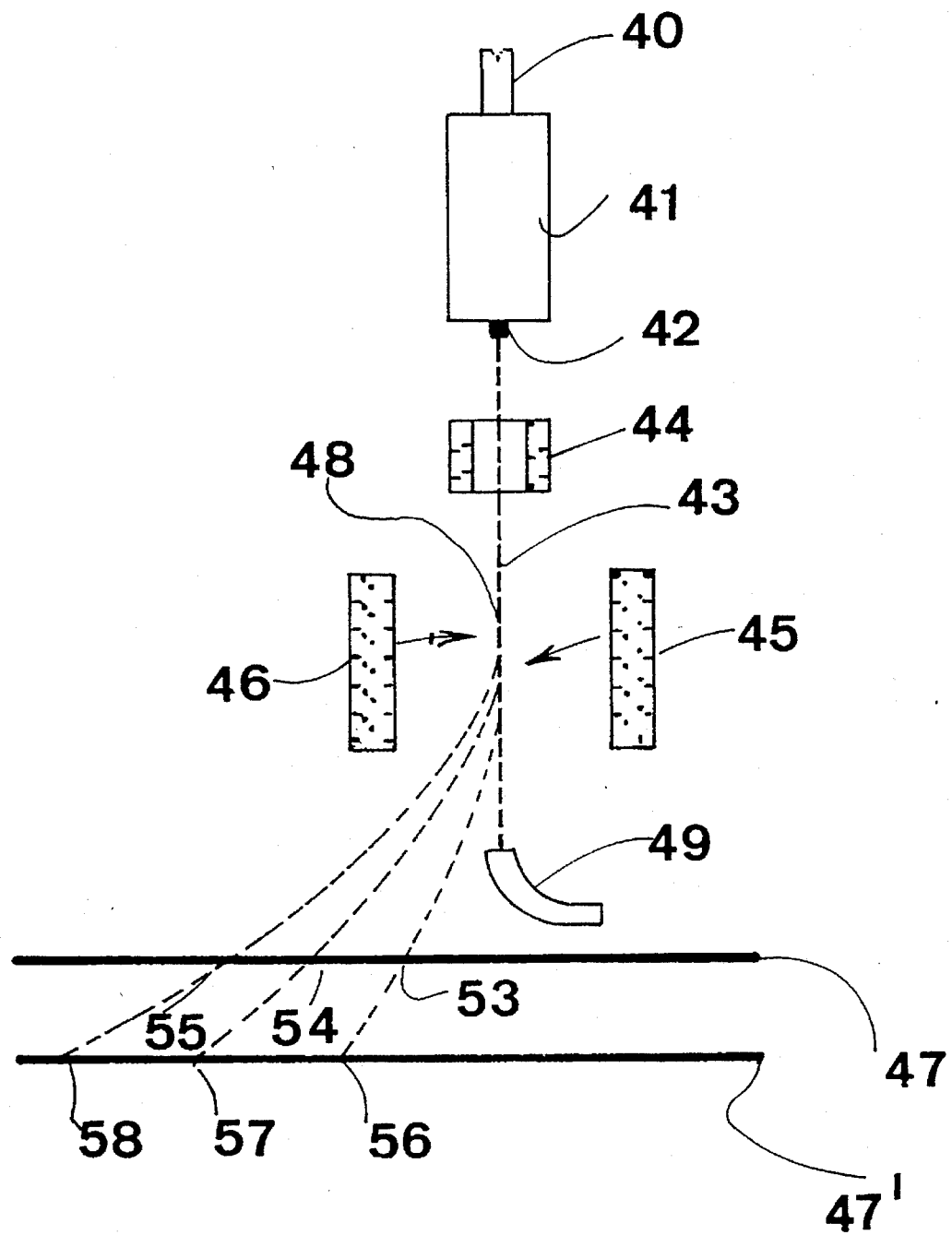
FIG. 2 is a schematic, side elevational view of a drop deviation printing head used in a preferred embodiment of the invention, which is of the electrostatic type.

FIG. 2 schematically illustrates the electrostatic, drop deviation jet-printing method preferably employed in carrying out the invention. In each single printing head, ink is fed continuously through a pipe 40 to a control unit 41, which feeds it to a nozzle 42, from which it issues in the form of drops as indicated at 43, which are collected by a discharge conduit 49, when the head is not activated for printing. The drops pass through charged electrode 44 which charges them electrostatically when the head is activated, and then through deflector plates 45–46, which produce an electrostatic field when the head is activated, and, according to the intensity of that field, deviate the ink drops to various trajectories, so that they impinge on a print substrate 47—which in this figure, which illustrates a conventional printing head and not the apparatus of the invention, is assumed to be still—in a variety of more or less deviated positions, such as 53, 54 and 55. 48 is the point from which the trajectories diverge. Assuming that 53 is the least deviated and 55 is the most deviated trajectory, the distance between points 53 and 55 is the deviation for the position 47 of the substrate. If the substrate is placed farther away from the head nozzle, e.g. in the position 47', the trajectories illustrated will impinge on it at points 56, 57 and 58, the distance 56–58 will become the deviation, and the area which can be covered by the printing head will be proportionally greater. However, it will not increase linearly, but faster than linearly, because the ink drop trajectories are not rectilinear, but approximately parabolic, as shown. It will be clear from the foregoing that FIG. 2 is a cross-section taken on the axial plane of the head and the lines 47 and 47' are the intersections of said plane with the substrate. It will also be apparent that if a plurality of orifices are controlled by unit 41, the head will be a multiple one, but its operation will be essentially the same. By suitably determining the distance of the print substrate from the head nozzles, two adjacent heads may be caused to produce print bands which border on one another to create wider bands. This will occur when the point 48 (of maximum deviation) of one head will become adjacent to the point 46 (of minimum deviation) of the other. This is the situation which occurs according to the invention, as will appear hereinafter. The head hereinbefore described is a single-drop one. As already noted, heads are available which are capable of concurrently ejecting a plurality of drops, and in regard to them the aforesaid considerations will apply to each of said drops.

Figure 1:
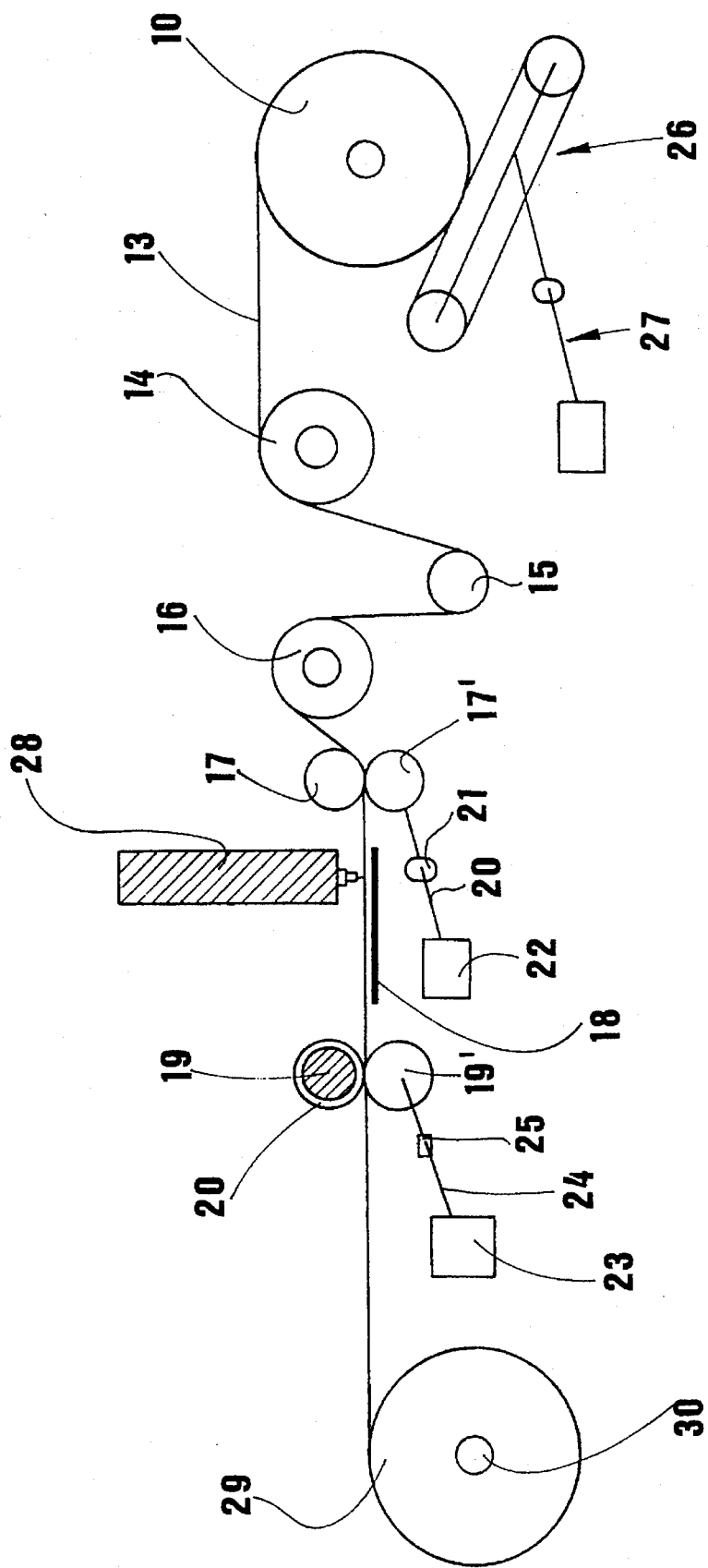
FIG. 1 is a schematic, side elevational view of a printing machine according to an embodiment of the invention.

An embodiment of an apparatus according to the invention is schematically represented in FIG. 1. 10 indicates a roll of print substrate, which, in a preferred form of the invention, can be a bolt of textile fabric, woven or nonwoven, but could also be a continuous sheet of another material such as paper or plastic, which substrate is mounted on a support which may be driven for rotation, but is preferably freely rotatable about an axis 11 and caused to rotate by suitable means, such as by a belt generally indicated at 26 and urged against the outer surface of the roll by a counterweight device generally indicated at 27. The print substrate 13 passes over a guide roller 14 and under a tensioning roller 15 which is supported, e.g., on a swinging arm, so as to be freely oscillatable in a substantially vertical direction to impart to the print substrate 13 a suitable tension between roller 14 and a subsequent guide roller 16.

The substrate is then engaged by a feed device, which imparts to it a continuous feed motion. Said device may be of any kind, but is conveniently comprises a pair of feed rollers 17-17', which exert a feed pressure the one on the other. Said pressure can be created in any one of the many ways known in the art, e.g. by means of springs which urge the axis of one roller towards that of the other, or by hydraulic pressure, or, as schematically shown in FIG. 1, by supporting one of the rollers (the lower roller 17', in the figure) on an arm 20, pivoted at 21 to a stationary part of the machine and loaded by counterweight 22. Conveniently, one the the rollers, e.g. roller 17', is made of metal, and the other is made of a somewhat elastic material, e.g. rubber or a plastic, which has a sufficient rolling friction coefficient relative to the substrate. The tangential force due to the friction, which is equal to the product of the friction coefficient and the force exerted by the rollers on the substrate, must not be smaller, and is desirably greater, than the tension of the substrate, created as explained hereinafter.

From the feed device, the print substrate 13 travels on a flat supporting surface 18. In the schematic drawing of FIG. 1, the substrate is shown for the sake of clarity as spaced somewhat from the surface 18, but in practice it is in contact therewith and slides thereon. The substrate is then engaged by a tensioning device, of any suitable kind, shown by way of example as being constituted by a second pair of rollers 19-19'. Said tensioning rollers also exert a pressure on one another in any suitable way, e.g. as schematically shown, by means of a counterweight 23, mounted on a lever 24 pivoted at 25 and which carries roller 19' at the end opposite the counterweight. In the embodiment shown, roller 19 is provided with annular projections 20 which contact the substrate. These rings may be slidably slanted with respect to the longitudinal direction in order to impart to the backing a desirable transverse tension, or this may not be necessary or other means may be used for that purpose. Roller 19' is also preferably made of metal and roller 19 of a somewhat elastic material, such as rubber or a plastic.

The feed rollers are preferably actuated by an electronically controlled motor, the speed of which is synchronized by computer means with the motions of the printing heads, as hereinafter explained. The tensioning device is controlled to produce the desired tension. The rotation of the tensioning rollers is synchronized with that of the feed rollers to maintain said desired tension.

The space between roller pairs 17-17' and 19-19' is the printing space. Therein the printing heads, schematically indicated in FIG. 1 at 28, deposit ink drops of the various colors, according to a computer program, so as to create the desired, predetermined pattern. The printed substrate is finally wound, to constitute a finished package or roll 29, on a convenioent support rotated about an axis 30 in any convenient, conventional way.

Figure 3:
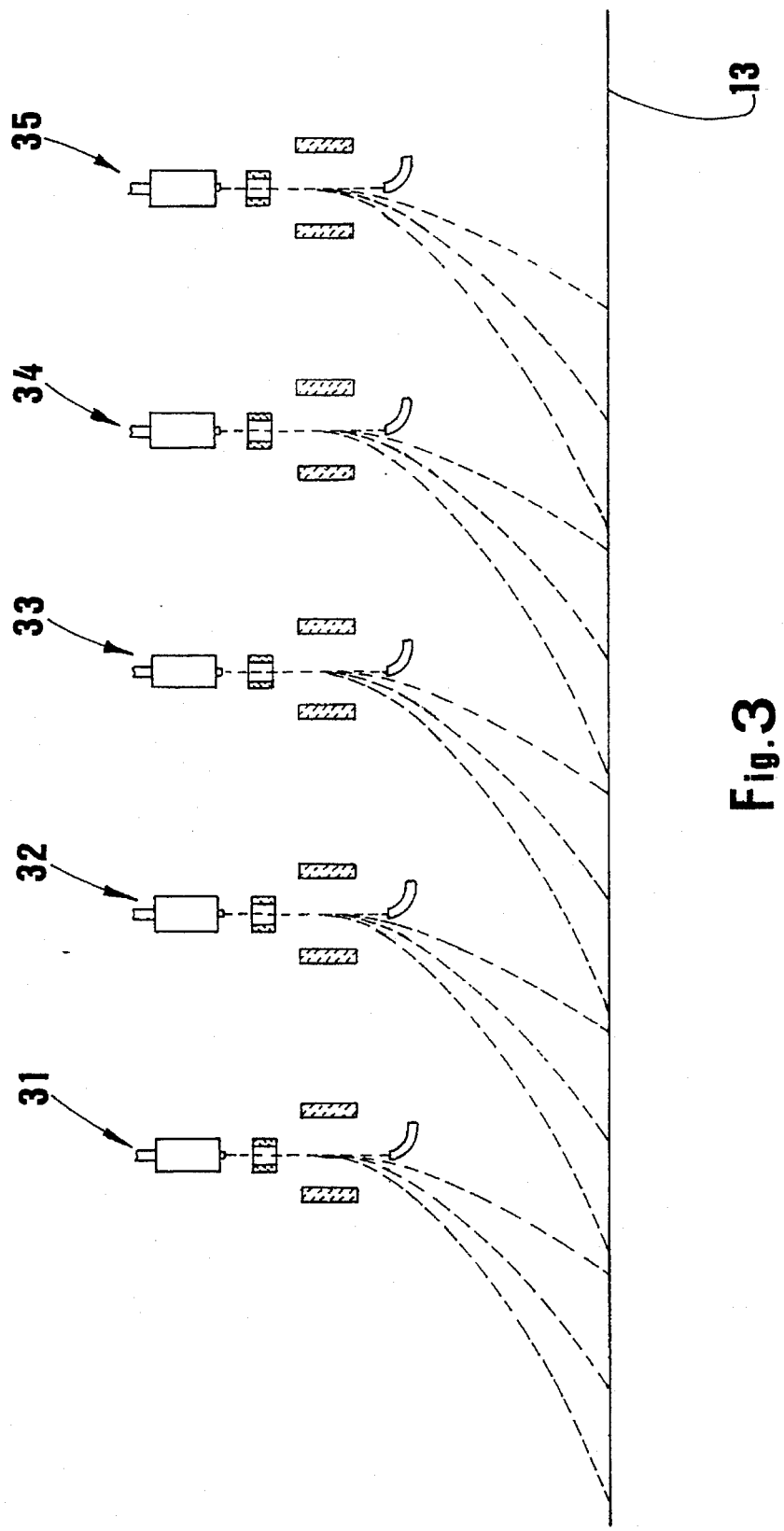
FIG. 3 is a partial, front elevational view of the machine of FIG. 1, the print substrate being in cross-section, showing the arrangement of printing heads in a printing station.

FIG. 3 schematically illustrates the way in which the printing heads are mounted on the apparatus according to an embodiment of the invention. The figure shows the substrate 13 in cross-section and the printing heads in front, vertical view. For reasons of scale, only five heads and the corresponding width of the substrate are shown. It is is seen that the heads 31, 32, 33, 34 and 35, which are illustrated only schematically as in FIG. 2, are so oriented that their axial planes—which coincide or, in other words, are superimposed on one another—are transversal, viz. perpendicular to the direction of the substrate's feed motion. Furthermore, they are placed at such a distance from the substrate that they cover all the width of the substrate—"width of the substrate" meaning the width thereof that is to be printed, since any unprinted marginal strips of the substrate are not considered in the description of the invention; or, in other words, the entire width of the substrate is reached by one head or the spaces left blank between adjacent, the pixels printed by adjacent heads abutting one another.

It is to be understood that the printing heads transversely alined over the substrate width, as shown on FIG. 3, will all print the same color. When a multicolor print is desired, a plurality of transversely alined heads will be provided for each color, to constitute a printing station for that color, and the several printing stations will be placed in longitudinal succession along the length of the machine, at such distances as may be required to prevent a color from interfering with another, e.g. to permit each color to dry or to be absorbed before another one is deposited on the substrate.

Figure 4:
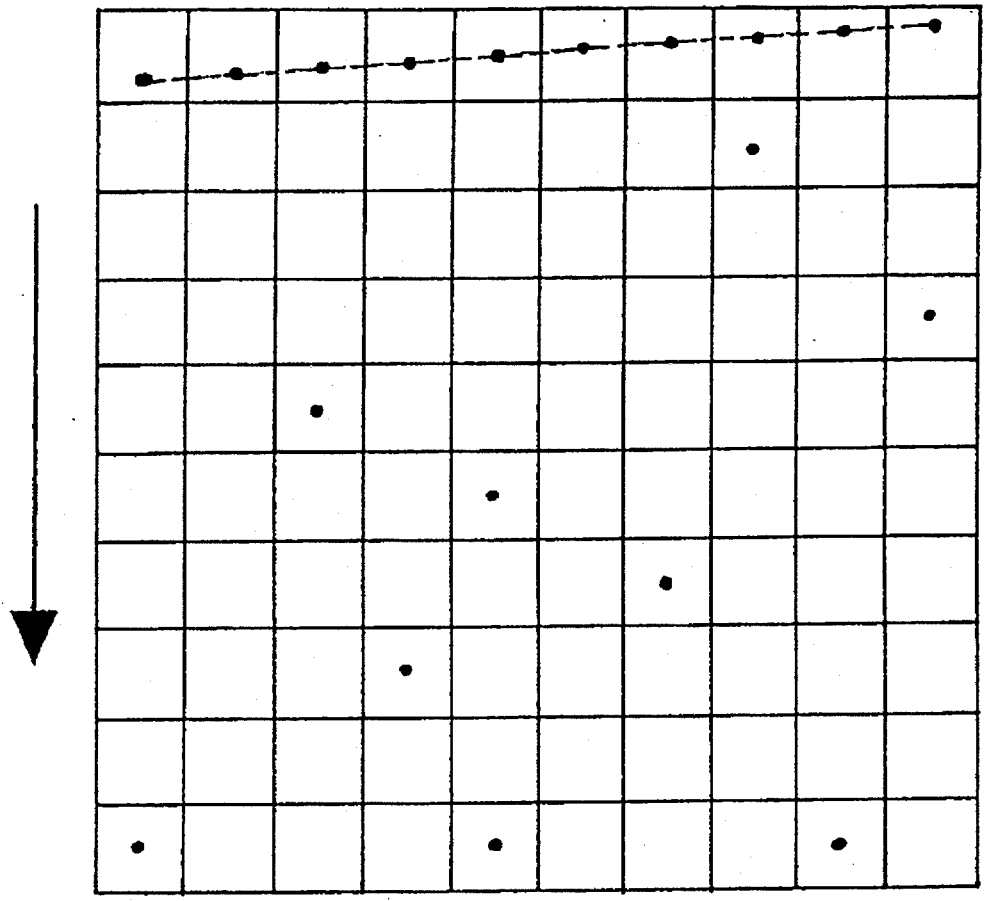
FIG. 4 illustrates the representation of a pixel of print by means of a a matrix.

FIG. 4 schematically illustrate a pixel of the print. The transverse dimension of a pixel is equal to the deviation of a head. In general a pixel is considered to be square. In the embodiment illustrated, the pixel is assumed to be represented by a 10×10 matrix, which means that each head can impart to the ink drop 10 different trajectories. The area which may receive one ink drop and no more is considered to be a pixel cell. In FIG. 4, the pixel has 100 cells, illustrated as squares. To obtain such a square pixel, the speed of the substrate feed motion must be coordinated with the speed of the ink drop ejection, as follows. The time required by the head for ejecting a number of drops that is equal to the number of possible trajectories, viz. to cover the entire deviation, will be called "the period" of the head. The period can be adjusted with printing heads known in the art and available on the market, according to the requirements of the particular work to be done, within certain limits, and so can the number of possible trajectories. The cells of the matrix representing the pixel, which are alined longitudinally (viz. in the direction of the substrate feed motion) will be considered to be the columns of the matrix, and those alined in the perpendicular (viz. transverse) direction will be considered to be the lines thereof. The head ejects the ink drops along the matrix lines. However, since the substrate moves while they are being ejected, they will impinge on the substrate on a line that is somewhat slanted with respect to the transverse direction. In FIG. 4 the arrow indicates the longitudinal direction. The direction along which the drops deposited on the substrate in the first line of the matrix are aligned, is shown as a broken line. If square pixels, consisting of square cells, are to be obtained, the following relation must obtain: $V=d/np$, wherein V is the speed of the substrate feed motion in mm/sec, p is the period in seconds, d is the maximum deviation in mm and n is the number of cells in a pixel line, viz. the number of possible trajectories of the ink drops. Thus, if the period is $1/200$ of a second, n is 10 and d is 5 mm, V must be 100 mm per sec. or 6 meters per min. If it is less, the print will be deformed. If it more, the pixel cells become longitudinally elongated rectangles and it is still possible to obtain a satisfactory print. If the pixels and/or the pixel cells are not square, a skilled person will easily carry out an analogous calculation to determine the value of V required to obtain the desired pattern. It should desirably be such that the substrate will advance by a distance equal to the longitudinal side of a pixel cell in the time p. In any case, every point of the substrate must be reachable by one head or another, which means that adjacent heads must produce pixels which abut on one another, unless, of course, it is desired to leave unprinted, blank longitudinal stripes in the printed substrate.

The control of the operation of the several printing heads to obtain the desired graphic patterns can be carried out by means known in the art. Thus, the patterns may be defined by an electronically registered program, obtained by any known means, or a graphic original may be used and the information obtained from it by means of a scanner. The operation of such a scanner and the way in which it can control the actuation of printing heads are well known in the art, and are e.g. further described in the aforementioned U.S. Pat. Nos. 3,553,371 and 4,547,786. Half-tone images can be obtained by the means described in U.S. Pat. No. 3,604,846, or by any other means known in the art. However, controlling the printing directly from a single scanned original will result in a repetitive pattern. To obtain a non-repetitive one, the chromatic information must be registered e.g. in a hard memory and transmitted to the printing heads control. There are several ways in which this can be done. One way is to scan various, different originals and successively register the chromatic information relative to them, thus obtaining a pattern having such a long period that it can be considered non-repetitive for practical purposes. Another way is to employ pattern elements, which may have been derived from originals, and combining them in continuously varying manners, by a suitable algorithm, producing patterns that can be completely non-repetitive. The use of television cameras for this purpose is described in DE 3422285. Finally, the pattern may be generated ab initio by an algorithm. Persons skilled in the art of producing graphic patterns by means of computers will be able to devise various ways for producing the desired patterns.

If the print substrate is a textile fabric, woven or nonwoven, suitable inks can used, containing appropriate dyestuffs. Ink compositions for printing on textiles are described e.g. in JP 61179272, JP 62243890 and JP 63145379.

While an embodiment of the invention has been described for purposes of illustration, it will be understood that persons skilled in the art can carry the invention into practice in different ways without departing from its spirit or from the scope of the claims.

I claim:

1. An apparatus for continuously printing on a continuous print substrate in sheet form, comprising:

means for supporting and continuously feeding a continuous sheet of print substrate past at least a printing station;

at least a printing station comprising a number of ink-jet printing heads of a drop deviation type mounted with their axial planes perpendicular to a direction of a print substrate feed motion; and each printing head comprising means for ejecting drops, charging means for applying to said drops an electric charge, and electrostatic deviating means for creating an electrostatic field, at the passage of each charged drops, such as to deviate said drop by a predetermined, desired amount.

2. Apparatus according to claim 1, wherein the printing heads are mounted in such a positioned relationship to the substrate and to one another that they cover the entire width of the print substrate, the pixels printed by adjacent heads abutting on one another.

3. Apparatus according to claim 1, wherein the print substrate is positioned below the printing heads in the printing space and is maintained in a sufficiently tensioned condition to provide a substantially flat surface for receiving the ink drops.

4. Apparatus according to claim 1, wherein each printing station prints one color and, for multicolor printing, a plurality of printing stations, at least one for each color, are provided and placed in longitudinal succession along the length of the machine.

5. Apparatus according to claim 1, further comprising means for controlling a speed of the substrate feed motion to produce a desired pixel pattern.

6. Method for continuously printing on a continuous print substrate in sheet form, comprising the steps of:

continuously feeding a continuous sheet of print substrate past at least a printing station;

depositing from said station onto the substrate printing inks or dyes, in a form of drops, at predetermined positions along a width of the substrate by ejecting said drops from a plurality of orifices;

electrically charging the drops and passing each of the drops through an electrostatic field of such strength as to deviate the drop along said width to an extent required for each drop to reach a predetermined position; and controlling ejection and deviation of said drops in coordination with a substrate feed motion, to produce a desired print patterns.

7. Method according to claim 6, wherein each printing station comprises a plurality of printing heads the axial planes of which coincide.

8. Method according to claim 7, wherein the distance between the substrate and printing station orifices is such that the positions onto which the drops can be deposited by said station substantially covers the entire width of the substrate.

9. Method according to claim 7, wherein a speed of the substrate feed motion in mm/sec is not less than a ratio of a maximum deviation of each printing head in mm to a product of a number of trajectories of the ink drops and a period of each printing head in seconds.

* * * * *